(12) United States Patent
Pagan (10) Patent No.: US 11,894,999 B1
(45) Date of Patent: Feb. 6, 2024

(54) RESOLVING INFORMATION DISCREPANCIES BETWEEN NETWORK ENTITIES

(71) Applicant: Charter Communications Operating, LLC, St. Louis, MO (US)

(72) Inventor: Matthew Aaron Pagan, Cripple Creek, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

(21) Appl. No.: 18/315,313

(22) Filed: May 10, 2023

(51) Int. Cl.
*H04L 43/091* (2022.01)
*H04L 43/0817* (2022.01)
*G06F 16/2455* (2019.01)
*G06F 16/22* (2019.01)
*H04L 43/0811* (2022.01)
*H04L 43/10* (2022.01)

(52) U.S. Cl.
CPC .......... *H04L 43/0817* (2013.01); *G06F 16/22* (2019.01); *G06F 16/24553* (2019.01); *H04L 43/0811* (2013.01); *H04L 43/091* (2022.05); *H04L 43/10* (2013.01)

(58) Field of Classification Search
CPC ............... H04L 43/081; H04L 43/0805; H04L 43/0811; H04L 43/091; H04L 43/10; H04L 43/12; G06F 16/22; G06F 16/24453
USPC .................................. 709/220, 224, 226, 228
See application file for complete search history.

(56) References Cited

U.S. PATENT DOCUMENTS

| | | | | |
|---|---|---|---|---|
| 8,255,649 | B2* | 8/2012 | Hiraiwa | G06F 11/2082 711/E12.103 |
| 11,093,896 | B2* | 8/2021 | Perrella | G06F 16/2246 |
| 11,212,192 | B2* | 12/2021 | Dawes | H04L 43/0817 |
| 2011/0078396 | A1* | 3/2011 | Hiraiwa | G06F 11/2082 711/E12.001 |
| 2013/0100830 | A1* | 4/2013 | Brady | H04W 4/02 370/252 |
| 2016/0028602 | A1* | 1/2016 | Mishra | H04L 43/0811 370/241.1 |
| 2020/0118064 | A1* | 4/2020 | Perrella | G06F 16/2246 |

FOREIGN PATENT DOCUMENTS

CN 106717062 B * 11/2019 ........... H04B 7/0623

* cited by examiner

*Primary Examiner* — Khanh Q Dinh
(74) *Attorney, Agent, or Firm* — Dority & Manning, P.A.

(57) ABSTRACT

Client status pairs are obtained for clients. Each of the client status pairs includes a first client status assigned by a first network entity and a second client status assigned by a second network entity. Mismatched client status pairs are identified from the client status pairs. Each mismatched client status pair includes a discrepancy between the first and second client status. A data structure is generated that stores the mismatched client status pairs in a portion of the data structure. The portion is associated with a unique type of mismatched client status pair. A script configured for the unique type is executed. For each mismatched client status pair stored in the portion, the script modifies a data store associated with the first network entity to replace the first client status with the second client status.

20 Claims, 5 Drawing Sheets

RESOLVING INFORMATION DISCREPANCIES BETWEEN NETWORK ENTITIES

BACKGROUND

Network entities generally build, install, and maintain network resources (e.g., hardware devices, software, etc.) that are used to provide services to clients (e.g., telecommunication services, etc.). To ensure that services provided to client devices remain uninterrupted, and that additional clients can be acquired without interruption, some network entities build a greater quantity of network resources than is necessary to provide services to existing clients. However, these excess resources often go unused. Accordingly, in some instances, a network entity will provide excess network resources to another network entity. This other network entity can use the provided network resources to provide services to those provided by the first network entity (e.g., telecommunication services, etc.).

SUMMARY

Implementations of the present disclosure are directed to resolving discrepancies in information maintained by two network entities. For example, a computing system can obtain client status pairs that include client statuses assigned to clients by both a first and second network entity. The computing system can identify mismatched client status pairs and can generate a data structure to store the mismatched client status pairs. For each of the mismatched client status pairs, the computing system can execute a script configured to resolve the discrepancy between the particular type of client status pair.

In one implementation, a computer-implemented method is provided. The method includes respectively obtaining, by a computing system comprising a processor device, a plurality of client status pairs for a plurality of clients, wherein each of the plurality of client status pairs comprises a first client status assigned to the client by a first network entity and a second client status assigned to the client by a second network entity, and wherein the first network entity provides a telecommunication service to the plurality of clients using network resources provided by the second network entity. The method includes identifying, by the computing system, a plurality of mismatched client status pairs from the plurality of client status pairs, wherein each mismatched client status pair comprises a discrepancy between the first client status and the second client status. The method includes generating, by the computing system, a data structure that stores the plurality of mismatched client status pairs in a portion of the data structure, wherein the portion is respectively associated with a unique type of a plurality of unique types of mismatched client status pairs. The method includes, for the portion, executing, by the computing system, a script configured for the unique type of mismatched client status pair associated with the portion, wherein, for each mismatched client status pair stored in the portion, the script modifies a data store associated with the first network entity to replace the first client status with the second client status.

In another implementation, a computing system is provided. The computing system includes a memory one or more processor devices. The one or more processor devices are coupled to the memory to respectively obtain a plurality of client status pairs for a plurality of clients, wherein each of the plurality of client status pairs comprises a first client status assigned to the client by a first network entity and a second client status assigned to the client by a second network entity, and wherein the first network entity provides a telecommunication service to the plurality of clients using network resources provided by the second network entity. The one or more processor devices are coupled to the memory to identify a plurality of mismatched client status pairs from the plurality of client status pairs, wherein each mismatched client status pair comprises a discrepancy between the first client status and the second client status. The one or more processor devices are coupled to the memory to generate a data structure that stores the plurality of mismatched client status pairs in a portion of the data structure, wherein the portion is respectively associated with a unique type of a plurality of unique types of mismatched client status pairs. The one or more processor devices are coupled to the memory to, for the portion, execute a script configured for the unique type of mismatched client status pair associated with the portion, wherein, for each mismatched client status pair stored in the portion, the script modifies a data store associated with the first network entity to replace the first client status with the second client status.

In another implementation, a non-transitory computer-readable storage medium is provided. The non-transitory computer-readable storage medium includes executable instructions. The executable instructions cause the one or more processor devices to respectively obtain a plurality of client status pairs for a plurality of clients, wherein each of the plurality of client status pairs comprises a first client status assigned to the client by a first network entity and a second client status assigned to the client by a second network entity, and wherein the first network entity provides a telecommunication service to the plurality of clients using network resources provided by the second network entity. The executable instructions cause the one or more processor devices to identify a plurality of mismatched client status pairs from the plurality of client status pairs, wherein each mismatched client status pair comprises a discrepancy between the first client status and the second client status. The executable instructions cause the one or more processor devices to generate a data structure that stores the plurality of mismatched client status pairs in a portion of the data structure, wherein the portion is respectively associated with a unique type of a plurality of unique types of mismatched client status pairs. The executable instructions cause the one or more processor devices to, for the portion, execute a script configured for the unique type of mismatched client status pair associated with the portion, wherein, for each mismatched client status pair stored in the portion, the script modifies a data store associated with the first network entity to replace the first client status with the second client status.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply an initial occurrence, a quantity, a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B. The word "data" may be used herein in the singular or plural depending on the context. The use of "and/or" between a phrase A and a phrase B, such as "A and/or B" means A alone, B alone, or A and B together.

Network entities, such as telecommunication service providers, generally build and maintain a quantity of network resources (e.g., hardware devices, software, etc.) that is greater than the quantity of network resources strictly necessary to provide services to existing clients. This is done so that the provision of services to clients is not interrupted due to unexpected hardware failure or network load. However, in most instances, these network resources will go unused.

Accordingly, to optimize network utilization, some network entities will provide excess network resources to other network entities to be used for the provision of similar services. For example, assume that a first network entity wishes to provide telecommunication services to a group of clients but lacks the necessary network resource capacity, and that a second network entity that provides telecommunication services to a different group of clients possesses excess network resources. The second network entity can provide these excess network resources to the network entity so that the first network entity can provide telecommunication services to the group of clients. In such fashion, the second network entity can optimize network resource utilization while offsetting costs associated with maintenance of existing network resources.

Although these network entities will generally provide services to different groups of clients, both the first network entity and the second network entity will maintain and update information for clients of the first network entity (e.g., client statuses, client identifiers, etc.), so that the second network entity can properly manage the network resources provided to the first network entity. However, discrepancies often arise between the information maintained by the first network entity and the second network entity. For example, the first network entity may assign a client status of "suspended" to a client while the second network entity assigns a client status of "active." Such discrepancies can cause substantial interruptions to services provided to the affected client.

Resolving these discrepancies presents a variety of problems. In particular, it is common for network entities to maintain different network systems, Application Programming Interfaces (APIs), data structures, data organization schemas, etc., making communication and interpretation of data between entities prohibitively difficult. Due to these incompatibilities, it is often necessary for the first network entity to utilize multiple employees to detect and resolve discrepancies through manual data analysis and entry. This issue is further compounded by the sheer quantity of client information stored by both network entities. As such, these issues often result in the first network entity expending substantial quantities of daily man-hours while still failing to adequately resolve discrepancies to minimize service interruption for affected clients.

Accordingly, implementations of the present disclosure propose efficient and accurate resolution of client statuses, and other information, between network entities. For example, assume that a second network entity provides network resources to a first network entity for provision of telecommunication services. Within the systems of the network entities, clients of the first network entity can be assigned various client statuses. For example, one client who actively maintains a subscription for services from the first network entity can have a status of "active," while another client who has cancelled services provided by the first network entity can be assigned a status of "suspended."

A computing system associated with the first network entity can obtain client status pairs for clients of the first network entity. Each client status pair can include a first client status assigned to the client by the first network entity, and a second client status assigned to the client by the second network entity. The computing system can identify some of these client status pairs as being mismatched client status pairs. A mismatched client status pair includes a discrepancy between the first client status and the second client status of the pair. To follow the previous example, a client status pair can be mismatched when the first network entity assigns the client a status of "active" while the second network entity assigns the same client a status of "suspended."

Once identified, the computing system can generate a data structure (e.g., a Pandas dataframe, etc.) that stores the mismatched client status pairs. In particular, the data structure can include multiple portions (e.g., subframes, etc.) that can each store a unique type of mismatched client status pair. For example, one portion of the data structure can store "active/deactive" mismatched client status pairs in which one status is "active" and the other status is "deactive." Another portion of the data structure can store "active/ suspend" mismatched client status pairs in which one status is "active" and the other status is "suspend."

The computing system can include, or otherwise access, a library of scripts that includes a script unique to each type of mismatched client status pair. For each portion of the data structure, the computing system can execute a script associated with the unique type of mismatched client status pair stored by the portion. For example, for the portion of the data structure that stores active/deactive mismatched client status pairs, the computing system can execute a script configured to resolve discrepancies for active/deactive mismatched client status pairs. Specifically, the script can be configured to modify a data store associated with the first network entity to replace the first client status with the second client status.

In such fashion, the first network entity can accurately and efficiently resolve discrepancies between client statuses and other client information. In particular, the modularity of the script library executed by the computing system allows the first network entity to resolve multiple types of discrepancies that require different corresponding resolution actions. For example, in addition to replacing the first client status with the second client status, an "active/deactive" type mismatch may require the computing system to perform additional modifications to downstream systems of the first network entity, while an "active/suspend" type mismatch does not. By executing scripts specifically tailored for unique types of mismatched client statuses, the computing system can ensure that discrepancies are fully resolved across the entire computing environment of the first network entity.

It should be noted that the following figures illustrate various implementations of the present disclosure within the context of a particular example in which a mismatched pair of client statuses between network entities is resolved. However, this example is discussed only to more clearly illustrate various aspects of the present disclosure, and as such, the disclosure should not be interpreted as being limited to such an example. Rather, implementations of the present disclosure can be utilized to resolve a wide variety of discrepancies between any type or manner of information maintained by both the first network entity and the second network entity (e.g., mismatched client identifiers, billing information, address information, network resource assignments, APIs, etc.).

It should be noted that "client," is described herein, refers to a specific client device with a unique client identifier. For example, a client can refer to a smartphone used by a customer of a telecommunication service provider with an assigned Mobile Device Number (MDN) that serves as a client identifier. In some instances, a larger entity, such as a corporation, may obtain telecommunication services from a network entity for multiple client devices (e.g., a fleet of wireless communication devices, etc.). Although this larger entity may be considered a "client" of a network entity colloquially, as described herein, each of the client devices of the larger entity are considered "clients" with their own unique client identifiers.

Figure 1:
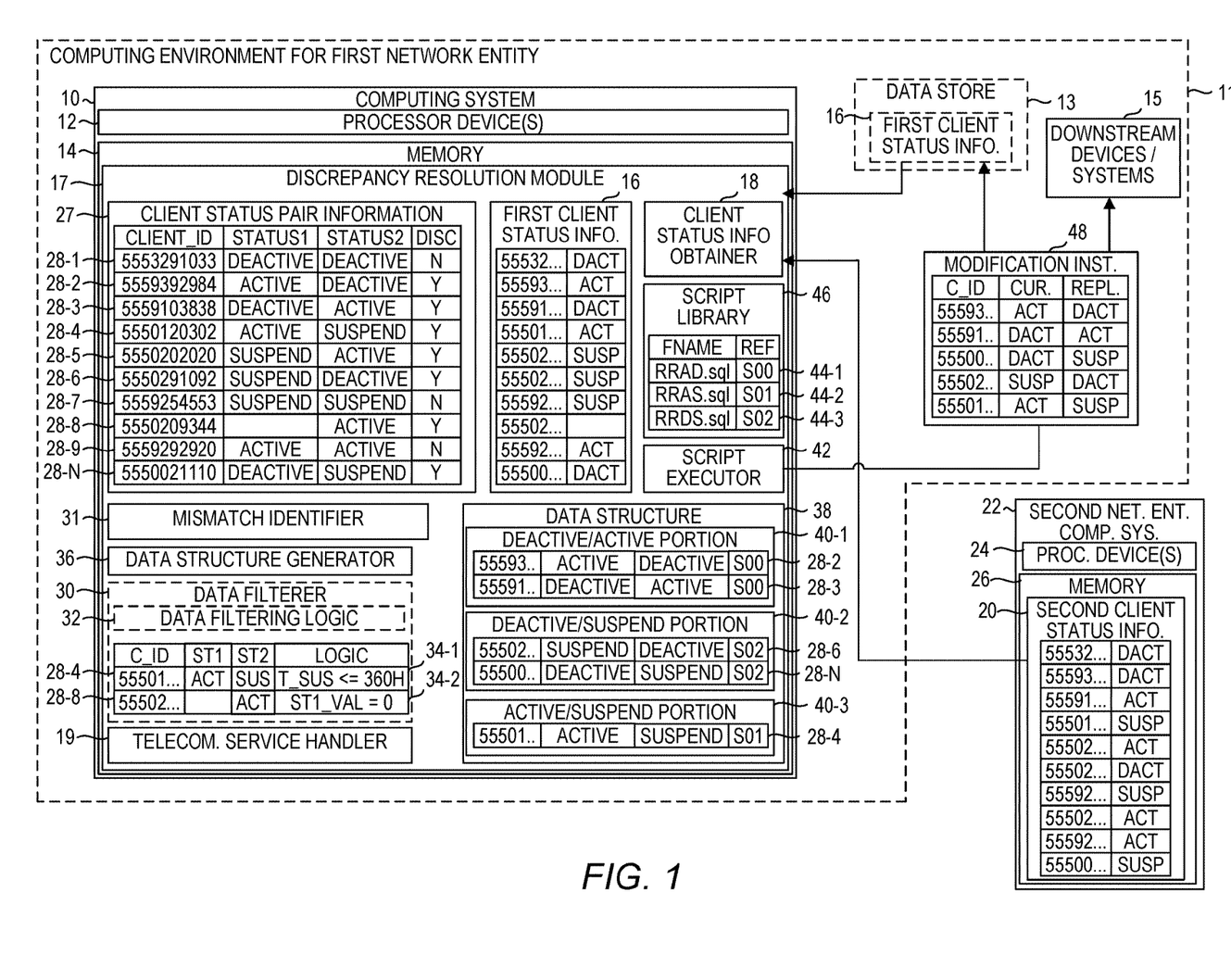
FIG. 1 is a block diagram of an environment suitable for resolution of mismatched client statuses between network entities. A computing system can be associated with a first network entity.

FIG. 1 is a block diagram of an environment suitable for resolution of mismatched client statuses between network entities. A computing system 10 can be associated with a first network entity. The first network entity can be an entity that provides telecommunication services, and to do so, maintains a computing environment 11 that includes the computing system 10 and other computing entity(s), such as a data store 13, downstream systems/devices 15, etc. For example, the computing system 10 can be a system that detects and resolves discrepancies between information maintained by the first network entity and information maintained by a second network entity. Additionally, in some implementations, the computing system 10 can be a computing system that directly provides or otherwise facilitates provision of telecommunication services to clients. For example, the computing system 10 may actively manage distribution and/or utilization of network resources received from the second network entity using telecommunication service handler 19.

The computing system 10 includes processor device(s) 12 and memory 14. In some implementations, the computing system 10 may be a computing system that includes multiple computing devices. Alternatively, in some implementations, the computing system 10 may be one or more computing devices within a computing system that includes multiple computing devices. Similarly, the processor device(s) 12 may include any computing or electronic device capable of executing software instructions to implement the functionality described herein.

The memory 14 can be or otherwise include any device(s) capable of storing data, including, but not limited to, volatile memory (random access memory, etc.), non-volatile memory, storage device(s) (e.g., hard drive(s), solid state drive(s), etc.). For example, the memory 14 can include various types of containerized units of software instructions (i.e., "packaged containers"), scripts, modules, etc.

The computing system 10 can include a discrepancy resolution module 17. The discrepancy resolution module 17 can be software, hardware, or a collection of both software and hardware resources that collectively implement the operations described herein. Specifically, the discrepancy resolution module 17 can be utilized by the computing system 10 to resolve discrepancies between client statuses and/or other information maintained in computing systems by both a first network entity and a second network entity.

As described previously, the computing system 10 can be communicatively coupled to other devices or systems within the computing environment 11 of the first network entity. In some implementations, the first network entity may maintain a data store 13, or multiple data stores 13, for storing data that can be accessed by the computing system 10. For example, the data store 13 can include first client status information 16. The computing system can request the first client status information 16 from the data store 13 using the client status information obtainer 18 of the discrepancy resolution module 17. In response, the data store 13 can provide the first client status information 16 to the computing system 10. For another example, the data store 13 may collect, update, and place the first client status information 16 in a network location that is accessible to the computing system 10 (e.g., a publicly accessible drive, a file location accessible via API, an encoded drive, location, or information channel that can be decoded by the computing system 10, etc.). The computing system may iteratively scan the accessible location to obtain the first client status information 16 and/or any updates to the first client status information that have occurred since the computing system 10 last scanned the accessible location.

Alternatively, in some implementations, the data store 13 may be included in the computing system 10, and/or may be a role/function assigned to the computing system 10. For example, the computing system 10 can maintain the first client status information 16 within the memory 14, and can retrieve the first client status information 16 from the memory 14 and store the first client status information 16 in the discrepancy resolution module 17. For another example, the memory 14 may include the first client status information 16 and software instructions to implement the functionality of the data store 13. For yet another example, the computing system 10 may execute a unit of software instructions to implement a containerized data store 13.

The first client status information 16 can include information descriptive of a client status for each of a plurality of clients of services provided by the first network entity. In particular, the first client status information 16 can include a plurality of first client statuses respectively assigned to a plurality of clients by the first network entity. In particular, a first client status can be a status of a relationship between the client and the first network entity.

For example, if a client maintains an active subscription to telecommunication services provided by the first network entity, the client status assigned to the client by the first network entity can be an "active" status. For another example, if the client has cancelled a subscription to the telecommunication services provided by the first network entity, the client status assigned to the client by the first network entity can be a "DEACTIVE" status (e.g., service is suspended to the client). For yet another example, if the client has failed to fulfill scheduled transactions associated with a subscription to the telecommunication services provided by the first network entity, the client status assigned to the client by the first network entity can be a "suspend" status.

The computing system 10 can obtain second client status information from a second network entity. More specifically, the second network entity can be a network entity that possesses excess network resources. The second network entity can provide the excess network resources to the first network entity so that the first network entity can utilize the excess network resources to provide telecommunication services to the group of clients associated with the first client status information 16. However, as described previously, the second network entity will also assign client statuses to devices of clients of the first network entity to properly manage the excess network resources provided to the first network entity.

To do so, the second network entity can utilize a second network entity computing system 22. The second network entity computing system 22 can include processor device(s) 24 and a memory 26 as described with regards to the processor device(s) 12 and the memory 14 of the computing system 10. The memory 26 of the second network entity computing system 22 can include second client status information 20. The second client status information 20 can include a plurality of second client statuses respectively assigned to a plurality of clients by the second network entity.

The computing system 10 can obtain the second client status information 20 from the second network entity computing system 22 using the client status information obtainer 18 of the discrepancy resolution module 17. For example, the computing system 10 can utilize the client status information obtainer 18 to send a request for the second client status information 20 to the second network entity computing system 22 via an API of the second network entity computing system 22 (e.g., a client status request for each client, a single request that indicates each of the requested clients, etc.). In some implementations, the computing system 10 can perform data filtering operations described subsequently with regards to the data filterer 30 prior to requesting the second client status information 20 from the second network entity computing system 22 to reduce bandwidth and compute resource expenditure.

The computing system 10 can determine client status pair information 27 using a mismatch identifier 31 of the discrepancy resolution module 17. The client status pair information 27 can include client records 28-1-28-N (generally, client records 28). Each of the client records 28 can include a client identifier, a first client status assigned to the client by the first network entity, a second client status assigned to the client by the second network entity, and a discrepancy indicator that indicates whether there is a discrepancy between the pair of client statuses formed by the first client status and the second client status. To follow the depicted example, the client record 28-1 indicates that the associated client is assigned a "DEACTIVE" status by both the first network entity and the second network entity, and thus there is no mismatched client status pair that includes a discrepancy (e.g., a value of "N"). Conversely, the client record 28-2 indicates that the associated client is assigned a "active" status by the first network entity and a "DEACTIVE" status by the second network entity, and thus there is a mismatched client status pair that includes a discrepancy (e.g., a value of Y).

In some implementations, the computing system 10 can filter client records 28 from the client status pair information 27 using a data filterer 30 of the discrepancy resolution module 17. The data filterer 30 can implement data filtering logic 32 to remove client records 28 from the client status pair information 27 based on certain criteria. In some implementations, the data filtering logic 32 can remove client records 28 in which a discrepancy exists due to the client requesting cessation of service (i.e., cancelling a service subscription) within a threshold period of time. For example, filter criteria 34-1 indicates that the client record 28-4 is filtered from the client status pair information 27, despite having a discrepancy, because the suspension client status applied to the client by the second network entity is less than 360 hours old. In this manner, the computing system 10 can ensure that service is quickly restored to clients who may have erroneously cancelled their subscription to services provided by the first network entity.

Additionally, or alternatively, in some implementations, the data filtering logic 32 can remove client records 28 in which a discrepancy exists due to one of the network entities failing to apply a client status to the client. For example, filter criteria 34-2 indicates that the client record 28-8 is filtered from the client status pair information 27, despite having a discrepancy, because one of the mismatched client statuses is blank or otherwise has a null value. In this manner, the computing system can utilize alternate, more efficient methods of resolution to cause the first network entity to assign a client status to the client associated with the client record 28-8.

In some implementations, although not illustrated, the data filtering logic 32 can filter client records 28 from the client status pair information 27 if there is no discrepancy between the client statuses indicated by the client status records. Alternatively, in some implementations, subsequent processing operations utilizing the client status pair information 27 may simply skip or otherwise refrain from processing client records 28 that do not include a discrepancy, or may filter such client records 28 at a later step.

The computing system 10 can utilize a data structure generator 36 of the discrepancy resolution module 17 to generate a data structure 38. The data structure 38 can include multiple portions (i.e., partitions, subdivisions, etc.). Each of the portions 40-1, 40-2, and 40-3 (generally, portions 40) can store client records 28 associated with a unique type of mismatched client status pairs.

To follow the depicted example, portion 40-1 of the data structure 38 can store client records 28 with a "DEACTIVE/ ACTIVE" type of mismatched client status pair, such as client records 28-2 and 28-3. Portion 40-2 of the data structure 38 can store client records 28 with a "DEACTIVE/ SUSPEND" type of mismatched client status pair, such as client records 28-6 and 28-N. Portion 40-3 of the data structure 38 can store client records 28 with a "active/ suspend" type of mismatched client status pair, such as client record 28-4.

The data structure 38 can be any type or manner of data structure sufficient to store client records 28 in different portions based on the unique type of mismatched client status pair included in the client record 28. In some implementations, the data structure 38 can be a Pandas dataframe implemented using the Pandas open-source library in the Python® programming language, and the portions 40 can be subframes of the Pandas dataframe.

The computing system 10 can execute scripts for each portion 40 of the data structure 38. More specifically, the computing system 10 can utilize a script executor 42 of the discrepancy resolution module 17 to select and execute scripts 44-1, 44-2, and/or 44-3 (generally, scripts 44) stored in script library 46. The scripts 44 can each be configured to resolve a unique type of mismatched client status pair. To follow the depicted example, script 44-1 is a script configured to resolve "deactive/active" types of client status pair mismatches, script 44-2 is a script configured to resolve "deactive/suspend" types of client status pair mismatches, and script 44/3 is a script configured to resolve "active/ suspend" types of client status pair mismatches. In some implementations, the scripts 44 can utilize SQL query language to formulate queries that modify the data store 13 of the first network entity. For example, the script 44 can include a SELECT SQL query.

The script executor 42 can determine a script 44 to execute for each of the portions 40 of the data structure 38. For example, the script executor 42 can determine to execute script 44-1 for each of the client records 28 stored in portion 40-1 of the data structure 38 (e.g., client records 28-2 and 28-3). The script executor 42 can determine to execute script 44-2 for each of the client records 28 stored in portion 40-2 of the data structure 38 (e.g., client records 28-6 and 28-N). The script executor 42 can determine to execute script 44-3 for each of the client records 28 stored in portion 40-3 of the data structure 38 (e.g., client record 28-4).

By executing the scripts 44, the computing system 10 can resolve the discrepancies of the mismatched client status types included in the client records 28. In some implementations, the computing system 10 can resolve such discrepancies by replacing the first client type of a mismatched client type pair with the second client type of the mismatched client type pair in the data store 13 associated with the first network entity. In other words, the computing system 10 can resolve the discrepancy by replacing the status assigned to the client by the first network entity with the status assigned to the client by the second network entity.

The computing system 10 can execute the scripts 44 with the script executor 42 to generate modification instructions 48. The modification instructions 48 can include instructions to modify the first client status information 16 data store 13 to replace first client statuses with the second client statuses included in the second client status information 20. Specifically, the data store 13 can include the first client status information 16 that includes first client statuses assigned to the clients by the first network entity. For the clients with client records 28 stored in the data structure 38, the modification instructions 48 can include instructions to modify the first client status information 16 to replace the first client statuses of the clients with the second client statuses included in the second client status information 20.

To follow the depicted example, the first status client information 16 stores a client status of "active" for client 5559392984, and the second client status information 20 stores a client status of "deactive" for the same client. The modification instructions 48 can include instructions to modify the value of the first client status stored for client 5559392984 in the first client status information 16 from "active" to "deactive." Similarly, the modification instructions 48 can include instructions to modify the value of the first client status stored for client 5559103838 in the first client status information 16 from "deactive" to "active", the value of the first client status stored for client 5550202020 in the first client status information 16 from "deactive" to "suspend", the value of the first client status stored for client 5550120302 in the first client status information 16 from "active" to "suspend", etc.

In some implementations, the computing system 10 can execute the scripts 44 to perform additional downstream corrective actions. For example, the downstream systems/ devices 15 within the computing environment 11 for the first network entity may also store first client status information 16 to provide various operations and services. The computing system 10 can additionally provide the modification instructions 48, or information indicative of the modification instructions 48, to the downstream systems/devices 15. Additionally, or alternatively, in some implementations, the computing system 10 can perform additional resolution actions based on the client records 28 stored in the data structure 38 to locally resolve the discrepancies at the downstream systems/devices 15.

Figure 2:
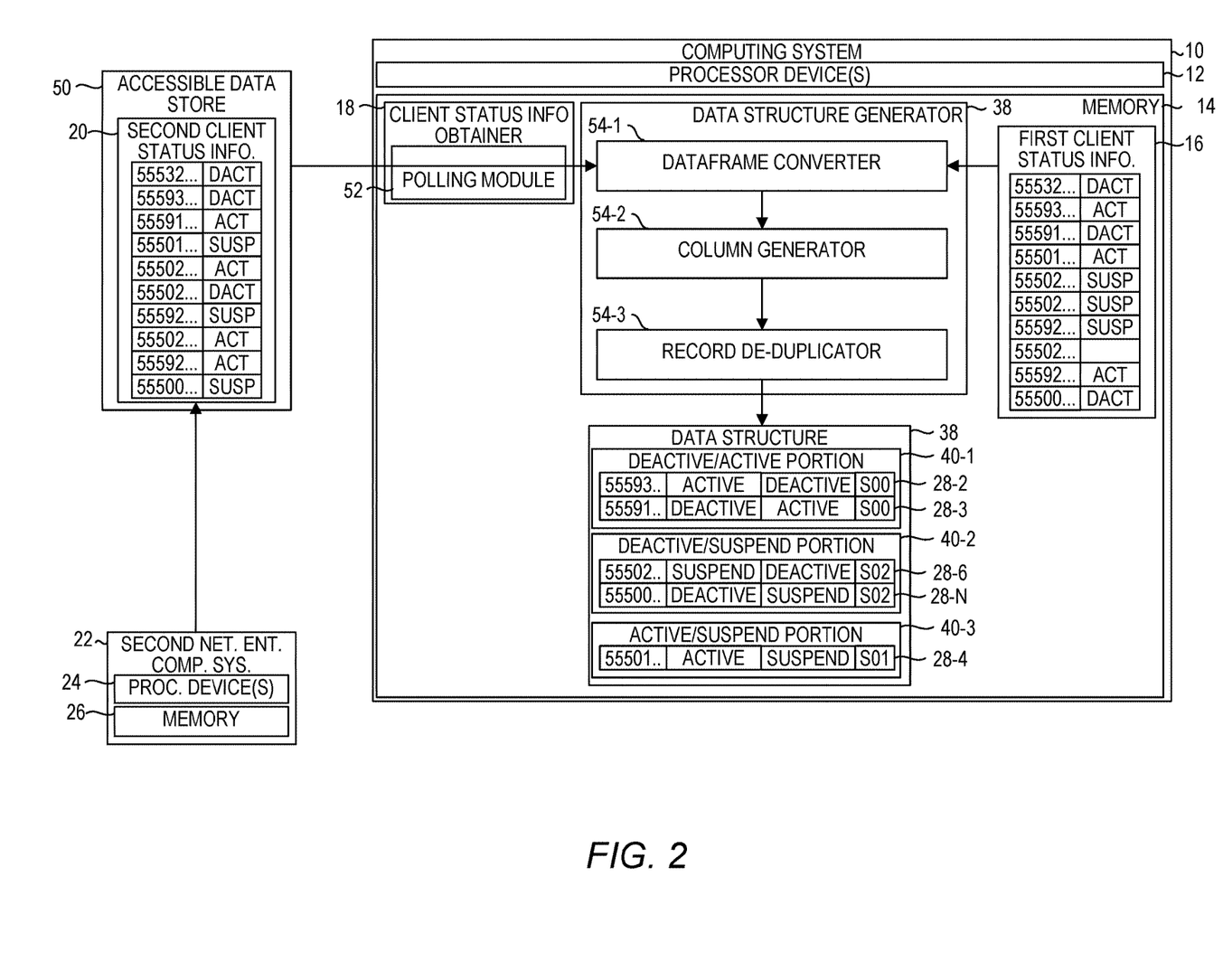
FIG. 2 is a data flow diagram for generating a data structure according to some implementations of the present disclosure.

FIG. 2 is a data flow diagram for generating a data structure according to some implementations of the present disclosure. FIG. 2 is discussed with regards to FIG. 1. Specifically, the second network entity computing system 22 can provide updated second client status information 20 to an accessible data store 50. For example, the second network entity computing system 22 can provide updated second client status information 20 whenever the information is updated, or when a number of updates to the information since a previous upload is greater than a threshold number of updates. The client status information obtainer 18 of the computing system 10 can include a polling module 52. The polling module 52 can poll the accessible data store at a certain frequency to obtain the second client status information 20 when updated. Once obtained, the data structure generator 36 can process the second client status information 20 and the first client status information 16 to generate the data structure 38.

In particular, the data structure generator 36 can include a dataframe converter 54-1. The dataframe converter 54-1 can convert the second client status information 20 and the first client status information 16 into a Pandas dataframe. The data structure generator 36 can include a column generator 54-2. The column generator 54-2 can structure, or otherwise organize, the second client status information 20 and the first client status information 16 within the data structure 38. For example, the column generator 54-2 can organize client identifiers, first client statuses, second client statuses, associated script identifiers, etc. into their own respective columns for the within the data structure 38.

In some implementations, the data structure generator 36 can include a record de-duplicator 54-3. The record de-duplicator 54-3 can determine whether any client records 28 are duplicates. For example, both the second client status information 20 and the first client status information 16 can include a duplicate of the client record 28-1 of FIG. 1. The record de-duplicator 54-3 can ensure that the information in each record is duplicated and can remove one of the entries from the data structure 38. Alternatively, in some implementations, the computing system can instead filter duplicate entries with the data filterer 30 of FIG. 1. In such fashion, the computing system 10 can generate a data structure that stores client records 28 in portions based on the unique type of mismatched client status pairs included in the client records 28.

Figure 3:
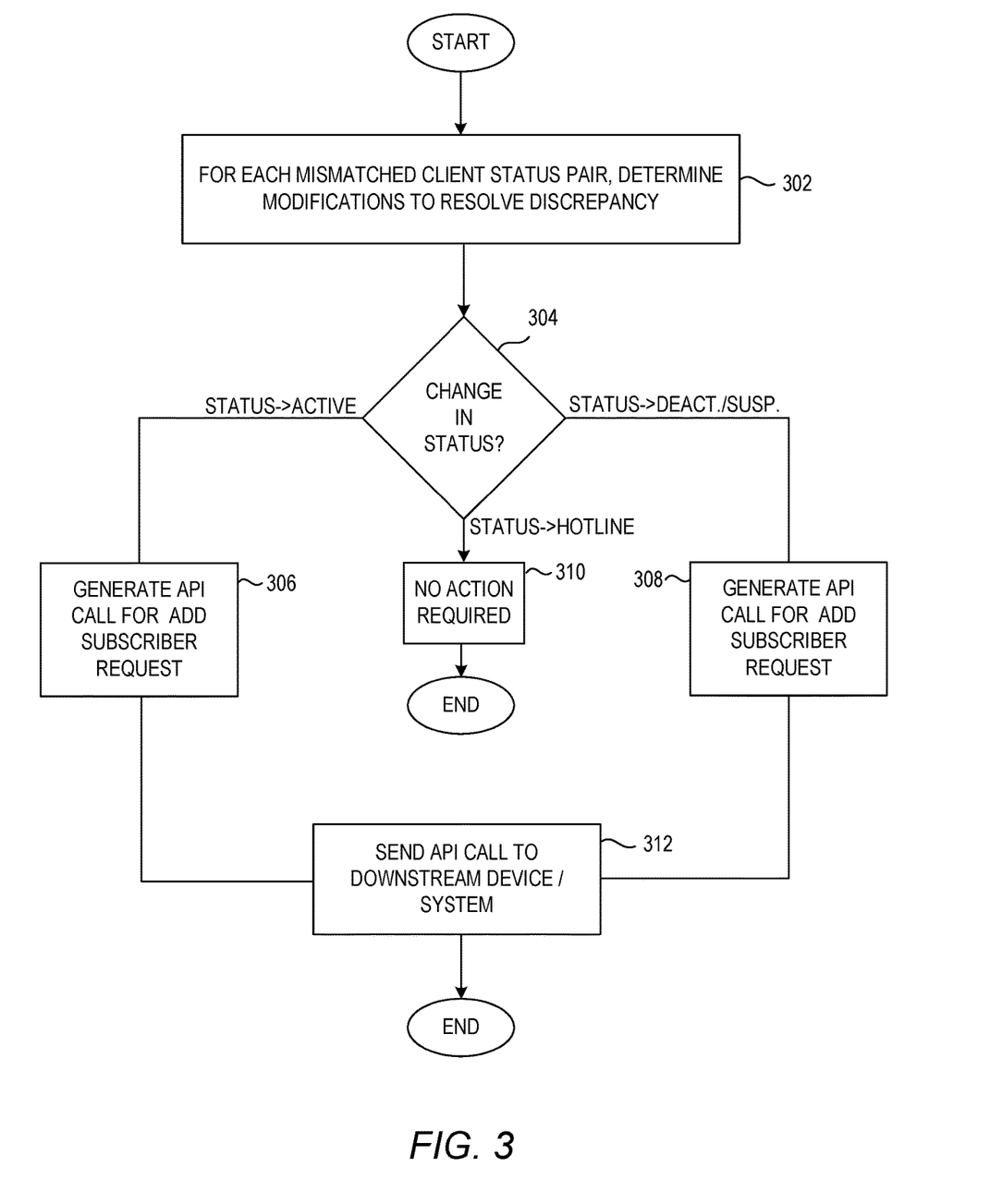
FIG. 3 is a flowchart for performing resolution actions for downstream devices and/or systems within a computing environment of a first network entity according to some implementations of the present disclosure

FIG. 3 is a flowchart for performing resolution actions for downstream devices and/or systems within a computing environment of a first network entity according to some implementations of the present disclosure. FIG. 3 will be discussed in conjunction with FIG. 1.

Specifically, at 302, computing system 10 can determine the modification instructions 48 to resolve discrepancies between mismatched client types. For example, if a client record 28 for a client includes a first client status of "deactive" and a second client status of "active", the modification instructions 48 can include instructions to modify the first client status information 16 to replace the status of "deactive" for the client with an "active" status (e.g., the status indicated by the second client status).

At 304, the computing system 10 can, for each modification, determine whether the modification causes a change in status, and if so, the type or manner of status change caused. A type of status change can include a change from an existing status to (a) a deactivated/suspended status, (b) an active status, or (c) a hotline status. For example, if the modification instructions 48 include modifications to change a status from active to deactive, the computing system would determine a status change from an existing status to a deactive/suspended status.

If the computing system 10 determines at 304 that the modification instructions 48 cause a change from an existing status to an active status for a client, the computing system can, at 306, generate an API call for an API associated with downstream computing system/device 15. The API call can include a request to add a subscriber. The API call can identify the subscriber as the client associated with the modification instructions 48. For example, the downstream computing system/device 15 may handle management of wireless communication devices for active subscribers. Upon receipt of the API call, the downstream computing system/device 15 can establish a record locally for a wireless communication device associated with the client.

If the computing system 10 determines at 304 that the modification instructions 48 cause a change from an existing status to a deactive/suspended status for a client, the computing system can, at 308, generate an API call for an API associated with the downstream computing system/device 15. The API call can include a request to delete a subscriber. The API call can identify the subscriber as the client associated with the modification instructions 48. To follow the previous example, the downstream computing system/device 15 may handle management of wireless communication devices for active subscribers. Upon receipt of the API call, the downstream computing system/device 15 can delete a record locally for a wireless communication device associated with the client.

If the computing system 10 determines at 304 that the modification instructions 48 cause a change from an existing status to a hotline status for a client, the computing system 10 can, at 310, refrain from generating any API call, or perform any other resolution actions, for the downstream computing system/device 15.

At 312, if the computing system 10 generates an API call at 306 or 308, the computing system 10 can send the API call to the downstream computing system/device 15.

Figure 4:
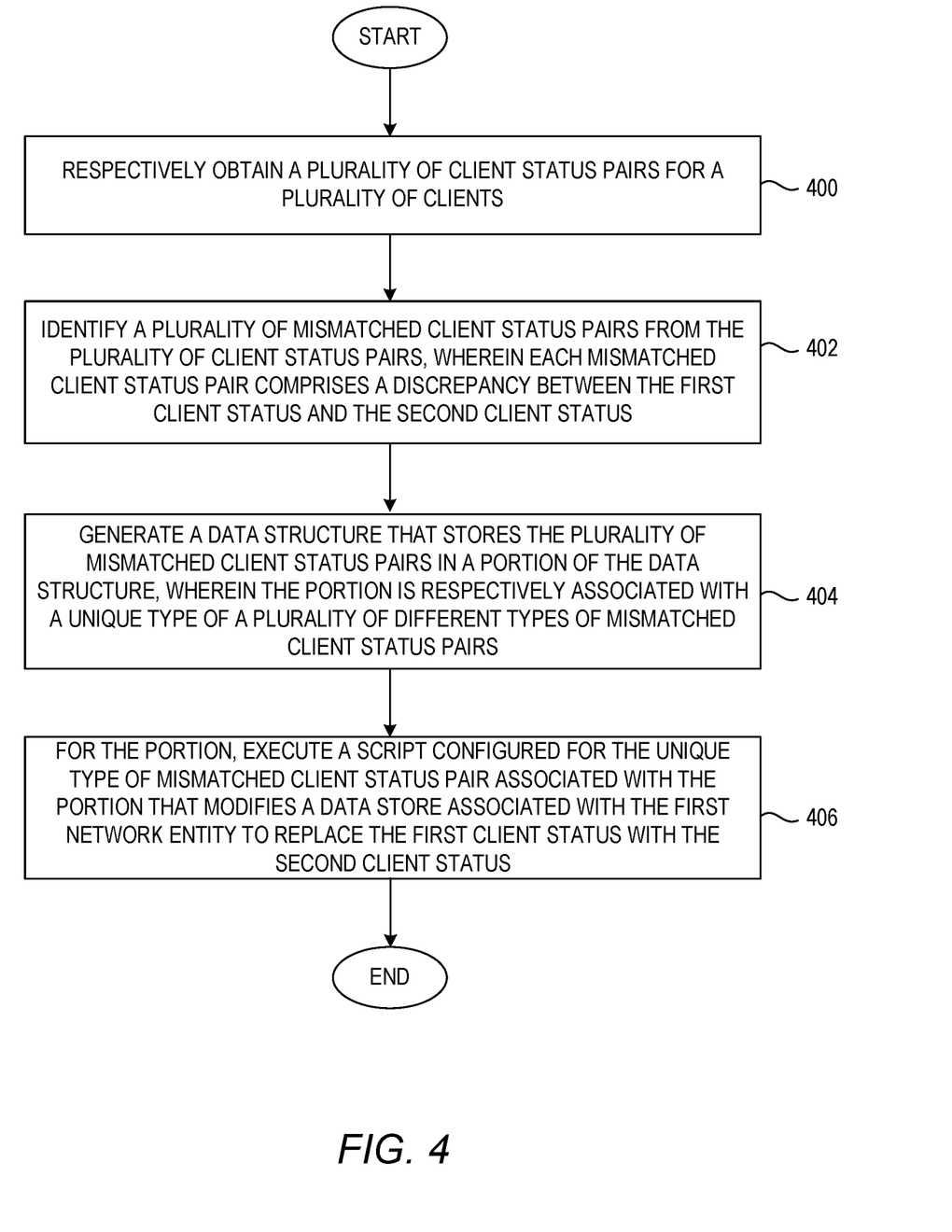
FIG. 4 is a flowchart of a method for resolving discrepancies between network entities according to some implementations of the present disclosure.

FIG. 4 is a flowchart of a method for resolving discrepancies between network entities according to some implementations of the present disclosure. FIG. 4 will be discussed in conjunction with FIG. 1.

A plurality of client status pairs for a plurality of clients are obtained, wherein each of the client status pairs includes a first client status (e.g., first client status information 16) assigned to the client by a first network entity and a second client status (e.g., second client status information 20) assigned to the client by a second network entity, and wherein the first network entity provides a telecommunication service to the plurality of clients using network resources provided by the second network entity (FIG. 4, block 400). A plurality of mismatched client status pairs are identified from the plurality of client status pairs (e.g., client records 28), wherein each mismatched client status pair comprises a discrepancy between the first client status and the second client status (FIG. 4, block 402). A data structure 38 is generated that stores the plurality of mismatched client status pairs in a portion 40 of the data structure, wherein the portion 40 is respectively associated with a unique type of a plurality of different types of mismatched client status pairs (FIG. 4, block 404). For the portion, a script 44 configured for the unique type of mismatched client status pair associated with the portion 40 is executed, wherein, for each mismatched client status pair stored in the portion 40, the script 44 modifies a data store 13 associated with the first network entity to replace the first client status with the second client status (FIG. 4, block 406).

Figure 5:
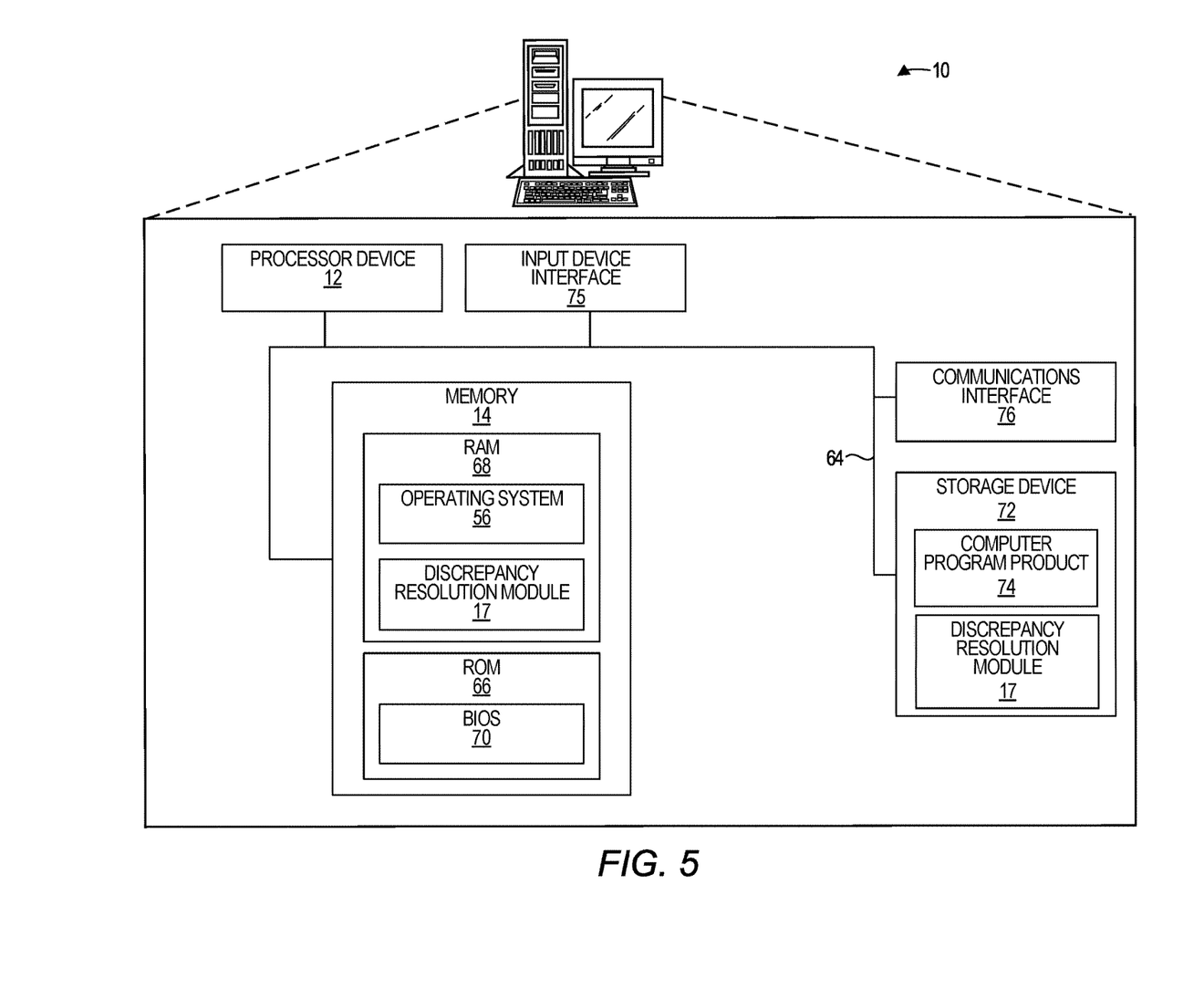
FIG. 5 is a block diagram of the computing system suitable for implementing examples according to one example.

FIG. 5 is a block diagram of the computing system 10 suitable for implementing examples according to one example. The computing system 10 may comprise any computing or electronic device capable of including firmware, hardware, and/or executing software instructions to implement the functionality described herein, such as a computer server, a desktop computing device, a laptop computing device, a smartphone, a computing tablet, or the like. The computing system 10 includes the processor device(s) 12, the system memory 14, and a system bus 64. The system bus 64 provides an interface for system components including, but not limited to, the system memory 14 and the processor device(s) 12. The processor device(s) 12 can be any commercially available or proprietary processor.

The system bus 64 may be any of several types of bus structures that may further interconnect to a memory bus (with or without a memory controller), a peripheral bus, and/or a local bus using any of a variety of commercially available bus architectures. The system memory 14 may include non-volatile memory 66 (e.g., read-only memory (ROM), erasable programmable read-only memory (EPROM), electrically erasable programmable read-only memory (EEPROM), etc.), and volatile memory 68 (e.g., random-access memory (RAM)). A basic input/output system (BIOS) 70 may be stored in the non-volatile memory 66 and can include the basic routines that help to transfer information between elements within the computing system 10. The volatile memory 68 may also include a high-speed RAM, such as static RAM, for caching data.

The computing system 10 may further include or be coupled to a non-transitory computer-readable storage medium such as the storage device 72, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 72 and other drives associated with computer-readable media and computer-usable media may provide non-volatile storage of data, data structures, computer-executable instructions, and the like.

A number of modules can be stored in the storage device 72 and in the volatile memory 68, including an operating system and one or more program modules, such as the discrepancy resolution module 17, which may implement the functionality described herein in whole or in part. All or a portion of the examples may be implemented as a computer program product 74 stored on a transitory or non-transitory computer-usable or computer-readable storage medium, such as the storage device 72, which includes complex programming instructions, such as complex computer-readable program code, to cause the processor device(s) 12 to carry out the steps described herein. Thus, the computer-readable program code can comprise software instructions for implementing the functionality of the examples described herein when executed on the processor device(s) 12. The processor device(s) 12, in conjunction with the discrepancy resolution module 17 in the volatile memory 68, may serve as a controller, or control system, for the computing system 10 that is to implement the functionality described herein.

Because the discrepancy resolution module 17 is a component of the computing system 10, functionality implemented by the discrepancy resolution module 17 may be attributed to the computing system 10 generally. Moreover, in examples where the discrepancy resolution module 17 comprises software instructions that program the processor device(s) 12 to carry out functionality discussed herein, functionality implemented by the discrepancy resolution module 17 may be attributed herein to the processor device(s) 12.

An operator, such as a user, may also be able to enter one or more configuration commands through a keyboard (not illustrated), a pointing device such as a mouse (not illustrated), or a touch-sensitive surface such as a display device. Such input devices may be connected to the processor device(s) 12 through an input device interface 75 that is coupled to the system bus 64 but can be connected by other interfaces such as a parallel port, an Institute of Electrical and Electronic Engineers (IEEE) 1394 serial port, a Universal Serial Bus (USB) port, an IR interface, and the like. The computing system 10 may also include the communications interface 76 suitable for communicating with the network as appropriate or desired. The computing system 10 may also include a video port configured to interface with a display device, to provide information to the user.

Individuals will recognize improvements and modifications to the preferred examples of the disclosure. All such improvements and modifications are considered within the scope of the concepts disclosed herein and the claims that follow.

What is claimed is:

1. A computer-implemented method comprising:
respectively obtaining, by a computing system comprising a processor device, a plurality of client status pairs for a plurality of clients, wherein each of the plurality of client status pairs comprises a first client status assigned to the client by a first network entity and a second client status assigned to the client by a second network entity, and wherein the first network entity provides a telecommunication service to the plurality of clients using network resources provided by the second network entity;
identifying, by the computing system, a plurality of mismatched client status pairs from the plurality of client status pairs, wherein each mismatched client status pair comprises a discrepancy between the first client status and the second client status;
generating, by the computing system, a data structure that stores the plurality of mismatched client status pairs in a portion of the data structure, wherein the portion is respectively associated with a unique type of a plurality of unique types of mismatched client status pairs; and
for the portion:
executing, by the computing system, a script configured for the unique type of mismatched client status pair associated with the portion, wherein, for each mismatched client status pair stored in the portion, the script modifies a data store associated with the first network entity to replace the first client status with the second client status.

2. The computer-implemented method of claim 1, wherein respectively obtaining the plurality of client status pairs for the plurality of clients comprises:
determining, by the computing system, a plurality of first client statuses respectively assigned to the plurality of clients by the first network entity; and
receiving, by the computing system, a plurality of second client statuses respectively assigned to the plurality of clients by the second network entity.

3. The computer-implemented method of claim 2, wherein receiving the plurality of second client statuses respectively assigned to the plurality of clients by the second network entity comprises providing, by the computing system via an Application Programming Interface (API), a client status request to the second network entity for each of the plurality of clients.

4. The computer-implemented method of claim 1, wherein generating the data structure that stores the plurality of mismatched client status pairs comprises:
assigning, by the computing system, a unique type of mismatched client status pair of a plurality of unique types of mismatched client status pairs to each of the plurality of mismatched client status pairs; and
filtering, by the computing system, one or more mismatched client status pairs assigned to a first unique type of mismatched client status pair from the plurality of mismatched client status pairs.

5. The computer-implemented method of claim 4, wherein the first unique type of mismatched client status pair comprises a blank or missing client status.

6. The computer-implemented method of claim 4, wherein the first unique type of mismatched client status pair comprises a client status associated with a client that has requested cessation of service within a threshold period of time.

7. The computer-implemented method of claim 4, wherein the first unique type of mismatched client status pair comprises two first client statuses.

8. The computer-implemented method of claim 1, wherein the script configured for the unique type of mismatched client status pair comprises a SELECT SQL query configured for the unique type of mismatched client status pair.

9. The computer-implemented method of claim 1, wherein the computing system comprises a computing system of a computing environment associated with the first network entity.

10. A computing system, comprising:
a memory; and
one or more processor devices coupled to the memory to:
respectively obtain a plurality of client status pairs for a plurality of clients, wherein each of the plurality of client status pairs comprises a first client status assigned to the client by a first network entity and a second client status assigned to the client by a second network entity, and wherein the first network entity provides a telecommunication service to the plurality of clients using network resources provided by the second network entity;
identify a plurality of mismatched client status pairs from the plurality of client status pairs, wherein each mismatched client status pair comprises a discrepancy between the first client status and the second client status;
generate a data structure that stores the plurality of mismatched client status pairs in a portion of the data structure, wherein the portion is respectively associated with a unique type of a plurality of unique types of mismatched client status pairs; and
for the portion:
execute a script configured for the unique type of mismatched client status pair associated with the portion, wherein, for each mismatched client status pair stored in the portion, the script modifies a data store associated with the first network entity to replace the first client status with the second client status.

11. The computing system of claim 10, wherein respectively obtaining the plurality of client status pairs for the plurality of clients comprises:
determining a plurality of first client statuses respectively assigned to the plurality of clients by the first network entity; and
receiving a plurality of second client statuses respectively assigned to the plurality of clients by the second network entity.

12. The computing system of claim 11, wherein receiving the plurality of second client statuses respectively assigned to the plurality of clients by the second network entity comprises providing, via an API, a client status request to the second network entity for each of the plurality of clients.

13. The computing system of claim 10, wherein generating the data structure that stores the plurality of mismatched client status pairs comprises:
assigning a unique type of mismatched client status pair of a plurality of unique types of mismatched client status pairs to each of the plurality of mismatched client status pairs; and
filtering one or more mismatched client status pairs assigned to a first unique type of mismatched client status pair from the plurality of mismatched client status pairs.

14. The computing system of claim 13, wherein the first unique type of mismatched client status pair comprises a blank or missing client status.

15. The computing system of claim 13, wherein the first unique type of mismatched client status pair comprises a client status associated with a client that has requested cessation of service within a threshold period of time.

16. The computing system of claim 13, wherein the first unique type of mismatched client status pair comprises two first client status or two second client statuses.

17. The computing system of claim 10, wherein the script configured for the unique type of mismatched client status pair comprises a SELECT SQL query configured for the unique type of mismatched client status pair.

18. The computing system of claim 10, wherein the computing system comprises a computing system of a computing environment associated with the first network entity.

19. A non-transitory computer-readable storage medium that includes executable instructions to cause one or more processor devices to:
respectively obtain a plurality of client status pairs for a plurality of clients, wherein each of the plurality of client status pairs comprises a first client status assigned to the client by a first network entity and a second client status assigned to the client by a second network entity, and wherein the first network entity provides a telecommunication service to the plurality of clients using network resources provided by the second network entity;
identify a plurality of mismatched client status pairs from the plurality of client status pairs, wherein each mismatched client status pair comprises a discrepancy between the first client status and the second client status;
generate a data structure that stores the plurality of mismatched client status pairs in a portion of the data structure, wherein the portion is respectively associated with a unique type of a plurality of unique types of mismatched client status pairs; and
for the portion:
execute a script configured for the unique type of mismatched client status pair associated with the portion, wherein, for each mismatched client status pair stored in the portion, the script modifies a data store associated with the first network entity to replace the first client status with the second client status.

20. The non-transitory computer-readable storage medium of claim 19, wherein respectively obtaining the plurality of client status pairs for the plurality of clients comprises:
determining a plurality of first client statuses respectively assigned to the plurality of clients by the first network entity; and
receiving a plurality of second client statuses respectively assigned to the plurality of clients by the second network entity.

* * * * *